US009532557B2

(12) United States Patent
Kennedy

(10) Patent No.: US 9,532,557 B2
(45) Date of Patent: Jan. 3, 2017

(54) HAND-GRIP ASSISTANCE DEVICE AND METHOD OF USE THEREOF

(71) Applicant: Talbot Kennedy, Atlanta, GA (US)

(72) Inventor: Talbot Kennedy, Atlanta, GA (US)

( * ) Notice: Subject to any disclaimer, the term of this patent is extended or adjusted under 35 U.S.C. 154(b) by 93 days.

(21) Appl. No.: 13/795,560

(22) Filed: Mar. 12, 2013

(65) Prior Publication Data
US 2014/0265387 A1 Sep. 18, 2014

(51) Int. Cl.
*A01K 89/01* (2006.01)
*A01K 97/00* (2006.01)
*A01K 89/00* (2006.01)

(52) U.S. Cl.
CPC ............ *A01K 97/00* (2013.01); *A01K 89/006* (2013.01); *Y10T 29/49826* (2015.01)

(58) Field of Classification Search
USPC .................................. 242/316, 323
See application file for complete search history.

(56) References Cited

U.S. PATENT DOCUMENTS

| | | | |
|---|---|---|---|
| 1,620,223 A | 3/1927 | Norcross | |
| 2,261,629 A * | 11/1941 | Murphy | 43/18.1 R |
| 3,126,166 A * | 3/1964 | Weinberg | A01K 89/017 242/250 |
| 3,217,332 A * | 11/1965 | Gross | 2/16 |
| 3,419,992 A * | 1/1969 | Strahm | 242/236 |
| 3,421,160 A * | 1/1969 | Domenico | 2/159 |
| 3,425,643 A * | 2/1969 | Lemon | 242/241 |
| 3,942,194 A | 3/1976 | Winter | |
| D267,129 S * | 12/1982 | Kneisley | D29/113 |
| 4,408,358 A * | 10/1983 | Swan | 2/161.1 |
| 4,559,735 A | 12/1985 | Batick, Jr. | |
| 4,606,484 A | 8/1986 | Winter et al. | |
| 4,830,306 A * | 5/1989 | Tsunoda | 242/316 |
| 4,923,418 A * | 5/1990 | Hoffman | 441/57 |
| 5,079,776 A * | 1/1992 | Crawford | 2/20 |
| 5,345,368 A * | 9/1994 | Huff | 362/103 |
| 5,768,710 A * | 6/1998 | Williams | 2/161.1 |
| 5,785,217 A * | 7/1998 | Gorham, Jr. | 223/111 |
| 5,791,705 A | 8/1998 | Romero et al. | |
| 6,449,895 B1 | 9/2002 | Zabihi | |
| 7,073,740 B2 | 7/2006 | Westhoff | |
| 7,086,622 B1 * | 8/2006 | Whaley | A01K 97/00 242/250 |
| 7,278,668 B1 | 10/2007 | Simmons | |
| 7,309,039 B1 * | 12/2007 | Stone | A01K 89/017 242/225 |
| 7,748,657 B1 * | 7/2010 | Goodman | A01K 89/003 242/250 |
| 7,909,280 B1 * | 3/2011 | Herrick | A01K 89/017 242/250 |
| 8,060,948 B2 * | 11/2011 | Pesic | 2/161.5 |
| 40,909 A1 * | 1/2012 | Powell et al. | 2/20 |
| D652,993 S * | 1/2012 | Long, III | D29/113 |
| 8,740,732 B2 * | 6/2014 | Finelli | 473/518 |
| 2002/0138953 A1 * | 10/2002 | Passafiume | 24/306 |

(Continued)

*Primary Examiner* — Emmanuel M Marcelo
(74) *Attorney, Agent, or Firm* — Mathew L. Grell; Grell & Watson Patent Attorneys

(57) ABSTRACT

A hand-grip assistance device that includes a securing mechanism with a base, stopper and clamp, and a glove with an attachment surface. A fishing reel handle is secured to the mechanism, and subsequently the mechanism is secured to the attachment surface of the glove.

15 Claims, 3 Drawing Sheets

(56) References Cited

U.S. PATENT DOCUMENTS

2004/0133965 A1\* 7/2004 Sandler ............................ 2/159
2007/0017138 A1\* 1/2007 Young .......................... 42/71.01
2010/0037363 A1\* 2/2010 Oakman ........................ 2/161.2

\* cited by examiner

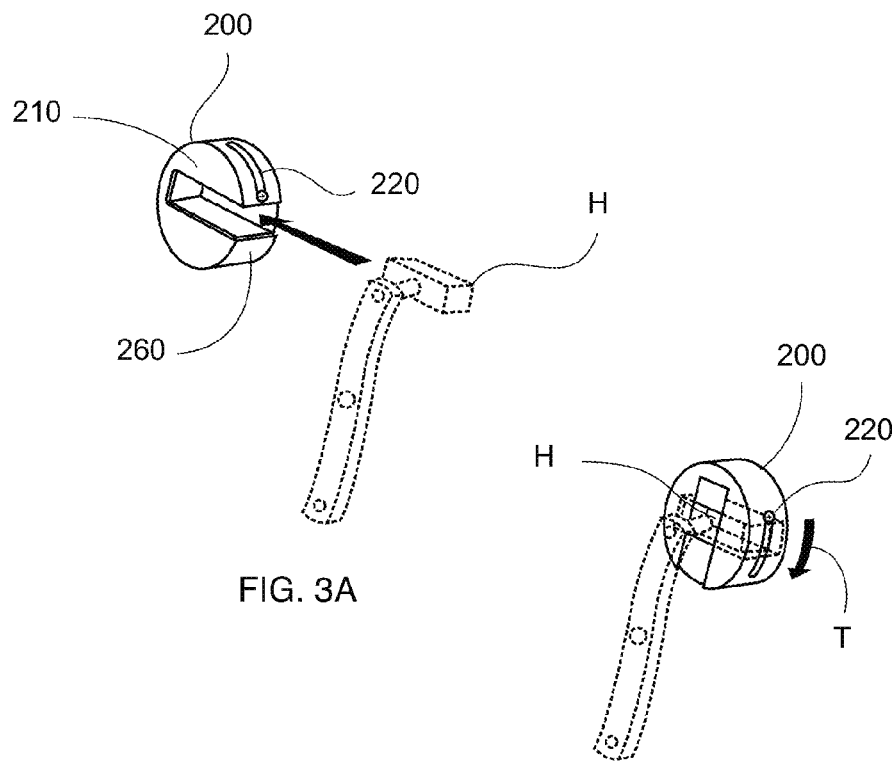
FIG. 3A
FIG. 3B
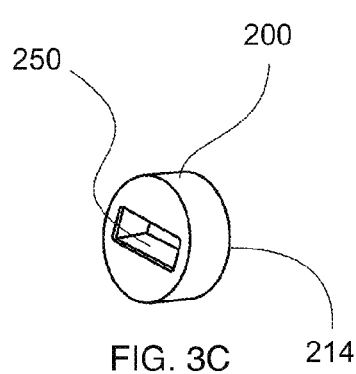
FIG. 3C
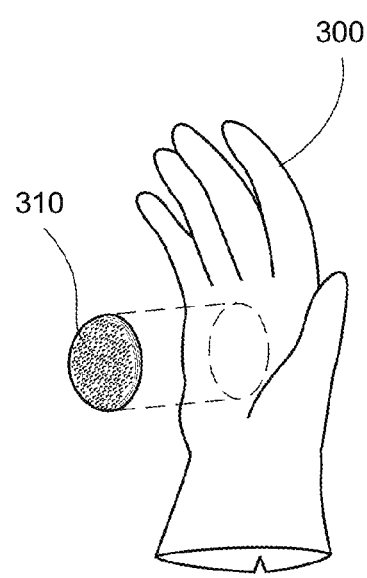
FIG. 4

HAND-GRIP ASSISTANCE DEVICE AND METHOD OF USE THEREOF

CROSS-REFERENCE TO RELATED APPLICATIONS

None

FEDERALLY SPONSORED RESEARCH OR DEVELOPMENT

None

PARTIES TO A JOINT RESEARCH AGREEMENT

None

REFERENCE TO A SEQUENCE LISTING

None

BACKGROUND OF THE INVENTION

1. Technical Field of the Invention

The disclosure generally relates to a fishing hand-grip assistance device and a method of using the same, and more specifically to a reel attachment designed to make fishing easier for people with impairment of their hands.

2. Description of Related Art

The disclosure relates generally to a hand-grip assistance device and a method of using the same.

One previous approach was to use two stiff discs that are rotatably attached together in face-to-face contact, with one of the rings having a ring of openings therein. A problem with this approach was that it overly complicated and thus burdensome to use.

Another approach was to use a socket that is integral with a rotatable part. As with other approaches, a problem was that this approach is difficult to manufacture and use in the field.

Yet another approach generally used to assist gripping items is to use a screw clamp that is employed on an appendage so that various utensils can be attached. A problem with this approach is that it does not address the requirements and conditions necessary to make fishing easy to setup and practice.

Therefore, it is readily apparent that there is a recognizable unmet need for a hand-grip assistance device that is easy to produce, simple to setup, allows for uncomplicated use in the field, and relatively easy to remove.

SUMMARY

Briefly described, in a preferred embodiment, the present apparatus and method overcomes the above-mentioned disadvantages and meets the recognized need for such a device by providing a hand-grip assistance device that is easy to produce, simple to setup, allows for uncomplicated use in the field, and relatively easy to remove.

The present apparatus and method includes a hand-grip assistance device that includes a securing mechanism with a primary attachment surface, a base, a stopper, and a clamp, and is includes a glove with an attachment surface. A fishing reel handle is secured to the mechanism, and subsequently the mechanism is secured to the attachment surface of the glove.

According to its major aspects and broadly stated, the present disclosure describes a fishing handle device, wherein the fishing handle device has a securing mechanism with a base, a stopper, and a clamp, and the clamp peripherally surrounds the stopper, and the clamp is parallel to the base. The securing mechanism also has a primary attachment surface. The fishing handle device also has a glove, the glove having a secondary attachment surface. The primary attachment surface and the secondary attachment surface are securable to each other.

Optionally, the stopper has a hole. The hole may extend to the periphery of the stopper, or the hole may be wholly enclosed within the stopper. The hole, if included, is dimensioned to receive a handle from a fishing reel.

In use, the handle of a fishing reel is placed against the securing mechanism, the securing mechanism having a base, a stopper, and a clamp, and the clamp is parallel to the base, and the handle of a fishing reel is actually placed against the stopper. The clamp is tightened around the stopper and the fishing reel handle, thereby securing them together. The primary attachment surface is secured to the secondary attachment surface, and the secondary attachment surfaced is attached to a glove.

More specifically, the present disclosure of a preferred embodiment is a hand-grip assistance device, the device having a securing mechanism and a glove, the glove having a secondary attachment surface. The securing mechanism has a clamp, a base, a primary attachment surface, a periphery, and a stopper, the stopper having a top and a bottom. The securing mechanism optionally also has a hole.

The primary attachment surface preferably has a circular shape, and is secured to the base, the base and stopper being secured together. The clamp peripherally surrounds the stopper, the clamp being mounted parallel to the base.

The handle of the fishing reel is secured to the stopper. In one embodiment, the handle is slid into the hole, the hole extending into the stopper's periphery. Subsequently the clamp is rotated in a tightening direction to enclose the handle within the clamp. The clamp is then tightened to secure the handle by pinching the stopper into the handle.

In another embodiment, the handle is placed into the hole, the hole not extending into the stopper's periphery. Subsequently the clamp is rotated in a tightening direction to enclose the handle within the clamp. The clamp is then tightened to secure the handle by pinching the stopper into the handle.

In yet another embodiment, the handle is placed on top of the stopper, and the stopper does not have a hole. The clamp is disposed to surround both the handle and the stopper, such that when the clamp is tightened than the clamp secures both the handle and the stopper, thereby also securing the handle and the stopper to one another.

After the handle is secured to the stopper, the primary attachment surface is secured to the secondary attachment surface. Preferably, the primary attachment surface and the secondary attachment surface are made of hook and loop, such as Velcro® or some such similar pair of surfaces that can be easily and securely attached together and removed from one another, but it will be recognized by those skilled in the art that the primary attachment surface and the secondary attachment surface may be securable together by any means known in the art.

Accordingly, a feature of the hand-grip assistance device is its ability to be easy to setup.

Another feature of the hand-grip assistance device is its ability to be easy to use.

Still another feature of the hand-grip assistance device is its ability to be relatively easy to manufacture.

Yet another feature of the hand-grip assistance device is its ability to continue to be used in a fishing environment without degradation to functionality.

Yet another feature of the hand-grip assistance device is its ability to attach to the handle or knob of a plurality of styles of reel, such as bait casting, spinning, open-faced spin casting and closed-faced spin casting reels and even a pencil sharpener or apple peeler or the like hand crank device.

Yet another feature of the hand-grip assistance device is its ability to be easily removed from one reel handle and attached to another reel handle.

These and other features of the fishing hand-grip assistance device will become more apparent to one skilled in the art from the prior Summary, and following Brief Description of the Drawings, Detailed Description, and Claims when read in light of the accompanying Detailed Drawings.

BRIEF DESCRIPTION OF THE DRAWINGS

The present fishing hand-grip assistance device will be better understood by reading the Detailed Description with reference to the accompanying drawings, which are not necessarily drawn to scale, and in which like reference numerals denote similar structure and refer to like elements throughout, and in which:

FIG. 3A is a perspective view of the securing mechanism of an exemplary embodiment;

FIG. 3B is a perspective view of the securing mechanism of the exemplary embodiment of FIG. 3A;

FIG. 3C is a perspective view of the securing mechanism of a different embodiment than FIG. 3A;

FIG. 4 is a perspective view of the glove and secondary attachment, of an exemplary embodiment.

Figure 1:
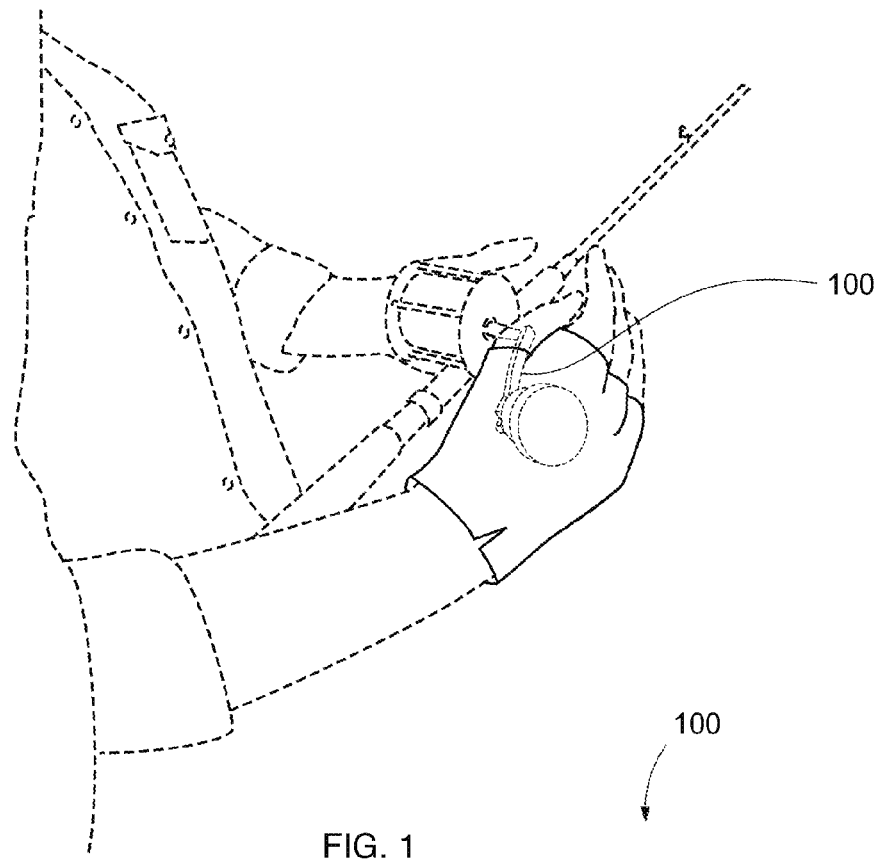
FIG. 1 is a perspective view of an exemplary embodiment, in use.

It is to be noted that the drawings presented are intended solely for the purpose of illustration and that they are, therefore, neither desired nor intended to limit the disclosure to any or all of the exact details of construction shown, except insofar as they may be deemed essential to the claimed invention.

DETAILED DESCRIPTION

In describing the exemplary embodiments of the present disclosure, as illustrated in FIGS. 1-5, specific terminology is employed for the sake of clarity. The present disclosure, however, is not intended to be limited to the specific terminology so selected, and it is to be understood that each specific element includes all technical equivalents that operate in a similar manner to accomplish similar functions. Embodiments of the claims may, however, be embodied in many different forms and should not be construed to be limited to the embodiments set forth herein. The examples set forth herein are non-limiting examples, and are merely examples among other possible examples.

Referring now to FIGS. 1-3C by way of example, and not limitation, therein is illustrated an example embodiment hand-grip assistance device 100, wherein hand-grip assistance device 100 comprises securing mechanism 200 and a cuff or other hand cover, such as glove 300, wherein glove 300 preferably includes secondary attachment surface 310. Securing mechanism 200 comprises clamp 220, base 230, primary attachment surface 240, periphery 250, and stopper 210, wherein stopper 210 preferably includes top 212 and bottom 214. Securing mechanism optionally also comprises hole 250 (best shown in FIG. 3C).

Figure 2:
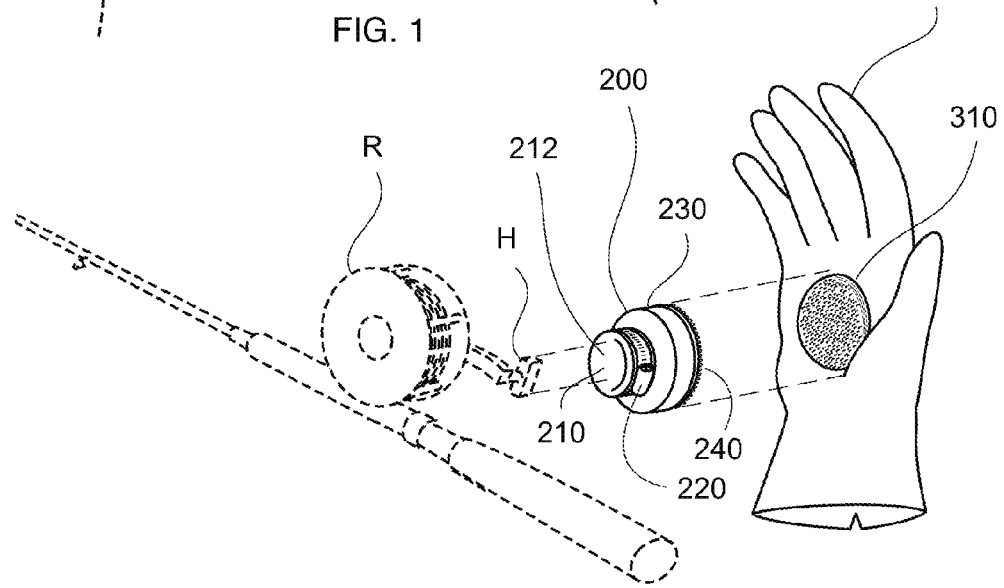
FIG. 2 is a perspective view of an exemplary embodiment, in use.

Turning more particularly to FIG. 2, primary attachment surface 240 preferably comprises a circular shape (best shown in FIG. 2), as do base 230 and stopper 210. Preferably, primary attachment surface 240 is fixedly secured to base 230, wherein base 230 and stopper 210 are fixedly secured together. Clamp 220 peripherally surrounds stopper 210, wherein clamp 220 is preferably mounted parallel to base 230.

Turning now to FIGS. 3A-3C, handle H of fishing reel R is preferably secured to stopper 210. In one embodiment, shown in FIGS. 3A-3B, handle H is slid into hole 250, wherein hole 250 extends into stopper's 210 periphery 260. Subsequently clamp 220 is preferably rotated in tightening direction T to enclose handle H within clamp 220. Preferably clamp 220 is then tightened to secure handle H by pinching stopper 210 into handle H.

In another embodiment, handle H is preferably placed into hole 250, wherein hole 250 does not extend into stopper's 210 periphery 260. Preferably clamp 220 is then tightened to secure handle H by pinching stopper 210 into handle H.

In yet another embodiment, handle H is preferably placed on top 212 of stopper 210, wherein stopper 210 does not comprise hole 250. Preferably clamp 220 is disposed to surround both handle H and stopper 210, wherein when clamp 220 is tightened than clamp 220 secures both handle H and stopper 210, thereby also securing handle H and stopper 210 to one another.

After handle H is secured to stopper 210, primary attachment surface 240 of securing mechanism 200 is preferably secured to secondary attachment surface 310 of glove 300. Preferably, primary attachment surface 240 and secondary attachment surface 310 comprise hook and loop or Velcro®, but it will be recognized by those skilled in the art that primary attachment surface 240 and secondary attachment surface 310 may be securable together by any means known in the art.

Figure 5:
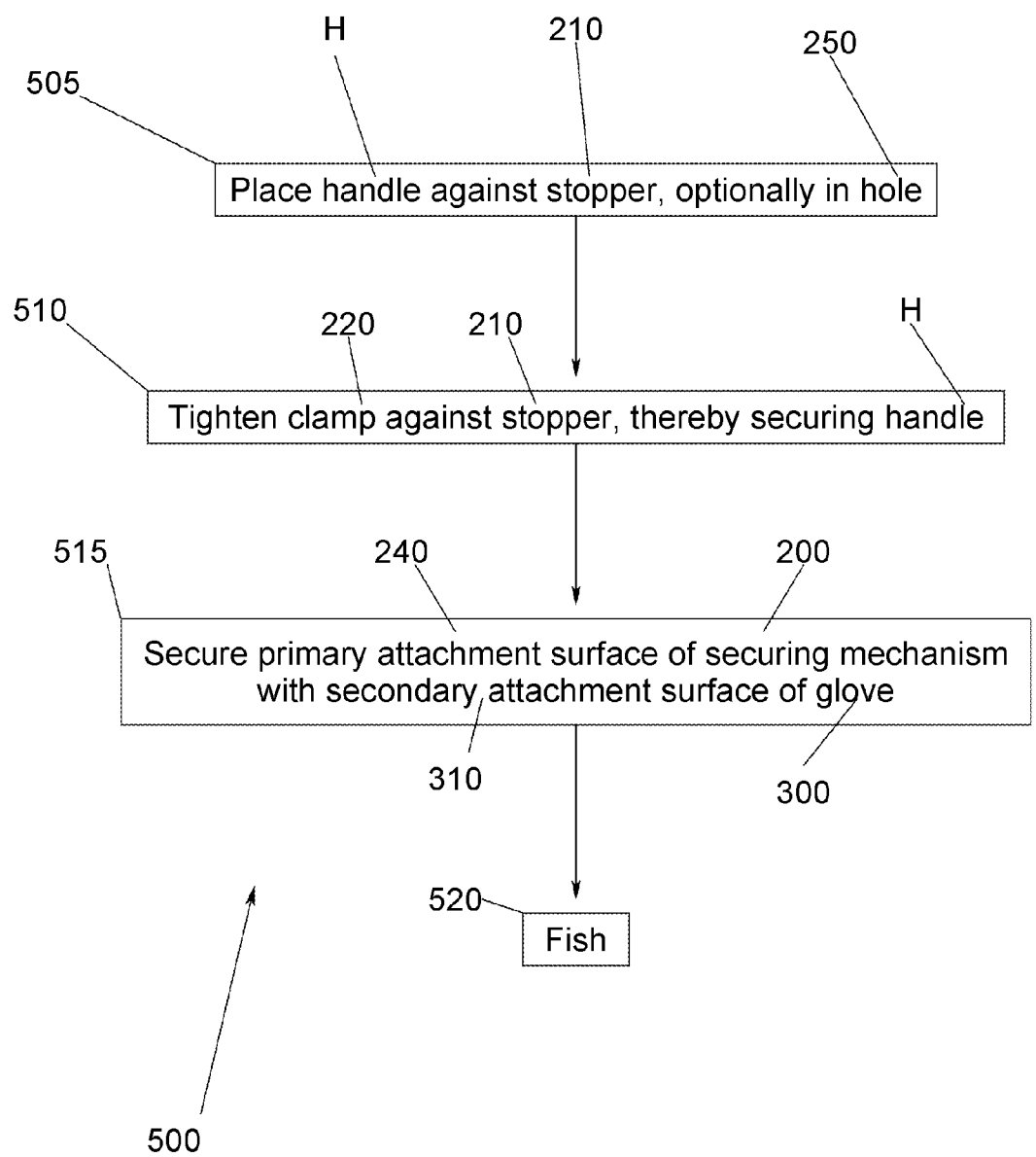
FIG. 5 is a flow chart depicting how this exemplary embodiment is preferably utilized.

Turning now to FIG. 5, method of using hand-grip assistance device 500 comprises placing handle H against stopper 210, via step 505, wherein if stopper 210 includes hole 250, then handle H is placed within hole 250; otherwise, handle H is placed against top 212 of stopper 210. Subsequently at step 510, clamp 220 is preferably tightened against stopper 210, thereby securing handle H. Via step 515, primary attachment surface 240 of securing mechanism 200 is preferably secured to secondary attachment surface 310 of glove 300. Finally, it's time to fish, via step 520.

The foregoing description and drawings comprise illustrative embodiments. Having thus described exemplary embodiments, it should be noted by those skilled in the art that the within disclosures are exemplary only, and that various other alternatives, adaptations, and modifications may be made within the scope of the present disclosure. Merely listing or numbering the steps of a method in a certain order does not constitute any limitation on the order of the steps of that method. Many modifications and other embodiments will come to mind to one skilled in the art to which this disclosure pertains having the benefit of the teachings presented in the foregoing descriptions and the associated drawings. Although specific terms may be employed herein, they are used in a generic and descriptive sense only and not for purposes of limitation. Accordingly, the present disclosure is not limited to the specific embodiments illustrated herein, but is limited only by the following claims.

What is claimed is:

1. A fishing handle device, wherein said fishing handle device comprises:
   a securing mechanism, wherein said securing mechanism comprises a base, a stopper comprising a hole, and a clamp, and wherein said clamp peripherally surrounds said stopper, and wherein said clamp is parallel to said base;
   wherein said securing mechanism is configured to secure the fishing handle device to a handle from a fishing reel.

2. The fishing handle device of claim 1, wherein said securing mechanism further comprises a primary attachment surface.

3. The fishing handle device of claim 2, wherein said fishing handle device further comprises:
   a glove, wherein said glove comprises a secondary attachment surface.

4. The fishing handle device of claim 3, wherein said primary attachment surface is securable to said secondary attachment surface.

5. The fishing handle device of claim 1, wherein said hole is dimensioned to receive the handle from the fishing reel.

6. A method of using a fishing handle device, said method comprising the step of:
   securing a handle of a fishing reel against a securing mechanism,
   wherein said securing mechanism comprises a base, a stopper, and a clamp, and wherein said clamp is parallel to said base, and
   wherein securing the handle of a fishing reel against said securing mechanism comprises securing the handle against said stopper; and
   tightening said clamp around said stopper and the fishing reel handle, thereby securing said stopper and the fishing reel handle.

7. The method of claim 6, wherein said securing mechanism further comprises a primary attachment surface.

8. The method of claim 7, said method further comprising the step of:
   securing said primary attachment surface to a secondary attachment surface, wherein said secondary attachment surfaced is comprised of a glove.

9. The method of claim 8, wherein stopper comprises a bottom, and wherein said bottom is fixedly secured to said base.

10. A hand-grip assistance device, wherein said hand-grip assistance device comprises:
    a securing mechanism, wherein said securing mechanism comprises a clamp and a base, and wherein said clamp and said base are parallel to each other, wherein said securing mechanism further comprises a primary attachment surface; and
    a glove, wherein said glove comprises a secondary attachment surface;
    wherein said primary attachment surface is securable to said secondary attachment surface, whereby said securing mechanism is configured to secure said glove to a handle from a fishing reel;
    wherein said securing mechanism further comprises a stopper; and
    wherein a stopper clamp peripherally surrounds said stopper.

11. The hand-grip assistance device handle of claim 10, wherein said stopper comprises a bottom, and wherein said bottom and said base are fixedly secured to each other.

12. The hand-grip assistance device of claim 10, wherein said stopper comprises a hole, a bottom, and a periphery.

13. The hand-grip assistance device of claim 12, wherein said bottom is fixedly secured to said base, wherein said hole extends into said periphery.

14. The hand-grip assistance device handle of claim 12, wherein said bottom is fixedly secured to said base, and wherein said hole does not extend into said periphery.

15. The hand-grip assistance device handle of claim 14, wherein said clamp peripherally surrounds said stopper.

* * * * *